Jan. 29, 1929.
J. J. SASS
1,700,377
RIBBON SPOOL
Filed May 3, 1926
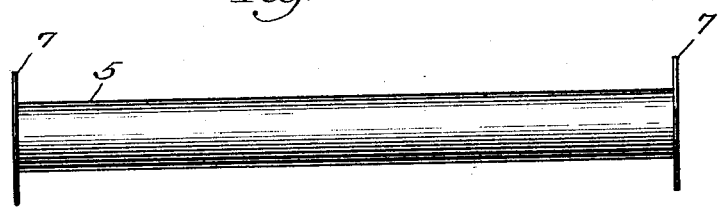
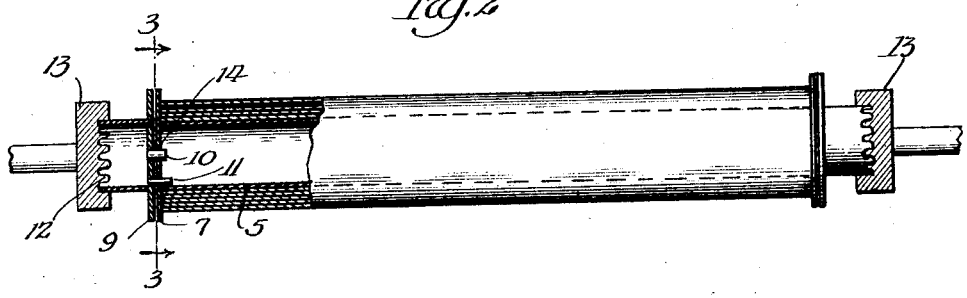
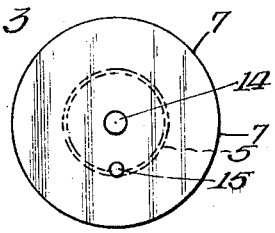
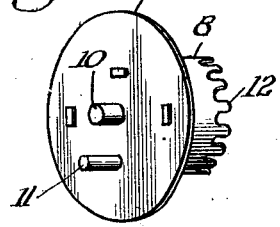
Inventor:-
John J. Sass
By Wm. O. Bell Atty.

Patented Jan. 29, 1929.

1,700,377

UNITED STATES PATENT OFFICE.

JOHN J. SASS, OF CHICAGO, ILLINOIS, ASSIGNOR, BY MESNE ASSIGNMENTS, TO ADDRESSOGRAPH COMPANY, OF CHICAGO, ILLINOIS, A CORPORATION OF DELAWARE.

RIBBON SPOOL.

Application filed May 3, 1926. Serial No. 106,226.

This invention relates to ribbon spools for printing machines and its object is to make available for a machine a ribbon spool which was not intended primarily for use in that machine.

A further object of the invention is to provide detachable adapters of novel and simple construction which can be employed at the ends of a spool to enable its use in a machine regardless of the fact that it was not intended for use in that machine.

In the accompanying drawings illustrating a selected embodiment of the invention Fig. 1 is a plan view of a spool without a ribbon thereon;

Fig. 2 is a similar view, partly in section, and with the adapters applied to the ends of the spool;

Fig. 3 is an end view of the spool; and

Fig. 4 is a perspective view of an adapter.

Referring to the drawings, the body of the spool 5 may be formed of wood or sheet metal bent to cylindrical shape with its edges united in any suitable manner. Circular disk flanges 7, 7, are secured on the ends of the spool, or adjacent the ends if desired, to protect the ends of the ribbon wound on the body of the spool. These disks may be secured to the body in any suitable manner, they may be of any size and they may be located on the ends of the spool or spaced from the ends of the spool as desired.

I provide adapters for engaging the spool ends and the means whereby the spool is revolved, that is to say, the mounting in which the spool is secured. One of these adapters is illustrated in Fig. 4 and it comprises a sleeve 8 on one end of which is secured a disk 9 having projections 10, 11, thereon. The other end of the sleeve has its edge serrated at 12 for interlocking engagement with the mounting 13. I prefer to make both adapters in this way but since it is customary to drive a spool from one end only it will obviously be sufficient to provide one adapter with serrations 12 and the other adapter may have a plain edge. One type of ribbon spool mounting with which my invention may be used is shown in Patent No. 1,506,891, patented September 2, 1924 to my assignee. I have shown serrations of a simple form but it will be understood that they indicate generically any formation or deformation of the end of the adapter for making interlocking engagement with the mounting; and for this purpose the edges may be corrugated or indented in a variety of ways or they may be polygonally or otherwise shaped. The projections 10 and 11 may be of any kind and may be disposed in any position; they are shown in one form spaced from each other to indicate any form of projections which will make interlocking engagement with the spool.

Spools may be made in various ways for use in different machines, they may have openings 14, 15 to receive projections like 10 and 11 on the spool mounting for making interlocking engagement therewith, or they may be otherwise constructed for this purpose. I do not limit the invention to an adapter of a particular construction for it will be understod that the means for making interlocking engagement between the adapter and the mounting and between the adapter and the spool may be changed in many ways without departing from the invention.

My invention provides a simple means whereby a ribbon spool may be used in a machine for which it was not intended by providing suitable interlocking means between the spool and the mounting. It is essential, of course, that there be rigid engagement between the spool at one end and the driving means, but the spool may revolve in the adapter at the other end or it may revolve with the adapter in the mounting at that end.

I am aware that other changes in the form, construction and arrangement of parts may be made without departing from the spirit or sacrificing the advantages of the invention and I reserve the right to make all such changes as fall within the scope of the following claims.

I claim:

1. As an article of manufacture, an adapter to be interposed between the end of a ribbon spool and its mounting and comprising a sleeve, a disk on one end of the sleeve to engage the end of the spool, projections on the disk to make interlocking engagement with the end of the spool, and the other end of the sleeve being serrated to make interlocking engagement with the mounting.

2. As an improved article of manufacture, an adapter to be interposed between the end of a spool and its mounting, the same comprising a sleeve, a disk on the end of the same to engage the end of the spool, the end of the sleeve having serrations for interfitting engagement with serrations on the adjacent face of the mounting, the said disk having a substantially central projection and an eccentric projection for cooperation with the disk on the end of the spool.

JOHN J. SASS.